United States Patent [19]

Barnard

[11] Patent Number: 5,553,856
[45] Date of Patent: Sep. 10, 1996

[54] STACKABLE PUZZLE AND A METHOD FOR STACKING CHARACTERS OF A SET TO FORM THE PUZZLE

[75] Inventor: Craig Barnard, Winnetka, Ill.

[73] Assignee: Fundustry, Inc., Winnetka, Ill.

[21] Appl. No.: 337,075

[22] Filed: Nov. 10, 1994

[51] Int. Cl.⁶ .................... A63F 9/12; G09B 1/06
[52] U.S. Cl. ............... 273/156; 273/157 R; 434/159
[58] Field of Search .................. 273/153 R, 157 R, 273/156, 160, 157 A; 446/117, 116, 120, 121, 122, 69; 434/159, 193, 195, 171, 203

[56] References Cited

U.S. PATENT DOCUMENTS

| | | |
|---|---|---|
| D. 163,085 | 5/1951 | Bishop . |
| 264,066 | 9/1882 | Crandall . |
| 1,153,542 | 3/1925 | Cogshall . |
| 2,415,342 | 2/1947 | Donner . |
| 2,513,596 | 7/1950 | Severson et al. . |
| 2,542,252 | 2/1951 | Ickler ................... 273/156 |
| 2,694,265 | 11/1954 | Way . |
| 2,839,842 | 6/1958 | Keyko . |
| 2,981,009 | 4/1961 | Lindquist ............... 446/117 |
| 3,305,945 | 2/1967 | Crawford et al. . |
| 3,630,527 | 12/1971 | Breslow . |
| 3,766,667 | 10/1973 | Glassman . |
| 3,811,206 | 5/1974 | Gaccetta . |
| 3,918,178 | 11/1975 | Riley . |
| 4,040,630 | 8/1977 | Brattain ................. 273/157 R |
| 4,382,794 | 5/1983 | Preus .................... 434/193 |
| 4,427,390 | 1/1984 | Manger . |
| 4,846,692 | 7/1989 | Delcambre . |
| 5,145,177 | 9/1992 | Wells .................... 273/157 R |

FOREIGN PATENT DOCUMENTS

| | | |
|---|---|---|
| 1174184 | 4/1957 | France . |
| 1263118 | 7/1960 | France . |
| 596861 | 3/1978 | Switzerland . |
| 214098 | 5/1923 | United Kingdom . |

*Primary Examiner*—Steven B. Wong
*Attorney, Agent, or Firm*—Hill, Steadman & Simpson

[57] ABSTRACT

A stackable puzzle and assembly having a set of known characters arrangeable in a know order are provided. The puzzle includes pieces that may be interconnected to form a stack of the pieces. The stack can only be arranged in the known order as a result of a unique arrangement of pegs and apertures on each of the interior pieces of the stack. The first piece preferably includes only pegs and the last piece only includes apertures. A method is further provided for stacking a plurality of characters representing a set of characters such that the set is arrangeable in a known order.

17 Claims, 2 Drawing Sheets

STACKABLE PUZZLE AND A METHOD FOR STACKING CHARACTERS OF A SET TO FORM THE PUZZLE

BACKGROUND OF THE INVENTION

The present invention generally relates to a puzzle and a method for forming the puzzle. More specifically, the present invention relates to a puzzle for educational and instructional purposes. The puzzle includes pieces representative of a known set of pieces such that the pieces are only arrangeable in a known order for the set.

It is, of course, generally known to provide a plurality of pieces that can be arranged forming a puzzle. The pieces typically are uniquely configured such that only one piece connects to another one of the pieces. Such puzzles can be simplified in nature for children of young ages and can also be substantially more complex for enjoyment and challenge for individuals of all ages.

Typically, puzzles are made from a plurality of planar pieces. The planar pieces, when connected, form the puzzle on a single plane identical to the plane of any one of the pieces.

At least one alphabetic puzzle or toy is known from U.S. Pat. No. 264,066 to Crandall. This patent discloses a toy obelisk composed of hollow sections wherein the top and bottom of each section is open and their sides embellished with, for example, letters of the alphabet. Each section has the form of a pyramidal frustum with their tops and bottoms open and so proportioned with relation to each other so as to form an obelisk when one section is placed on top of another section. The edges of the sections, when so placed, are contiguous to and coincident with the edges of the sections immediately in contact with them. On each side of each section is painted on, for example, the capital letters of the alphabet. In arranging the several sections, a child, for example, learns the order and proper arrangement of the letters of the alphabet and is made familiar with the characters of the alphabet.

However, such an arrangement is not necessarily instructive of the order of letters since an obelisk may be merely formed by the child by arranging the pieces in a manner such that one piece sits on top of another piece so as to form contiguous tapering side walls of the obelisk. If the wrong piece is chosen by the child, one piece merely fits into another piece or over the other piece without regard to the letter or order of the characters on each piece.

A need, therefore, exists for an improved toy or puzzle and a method for stacking where the characters of the toy or puzzle are representative of a known set of characters and the stacking thereof can only take place in the known order of the set.

SUMMARY OF THE INVENTION

The present invention provides an assembly having a set of known characters arrangeable in a known order. The assembly is in the form of a stackable puzzle constructed from a plurality of pieces. A method is further provided for stacking the plurality of characters representing a set of characters wherein the set is arrangeable only in a known order.

To this end, in an embodiment, an assembly is provided having a set of known characters arrangeable in a known order. The assembly comprises the plurality of pieces wherein each piece is distinctly shaped to represent one of the known characters. A peg has a cross-sectional area projecting perpendicularly from at least one of the plurality of pieces. An aperture defines a cross-sectional area slightly larger than the cross-sectional area of the peg. The aperture is constructed and arranged through another one of the plurality of pieces such that the peg projecting from the at least one of the plurality of pieces only fits through the aperture of another piece such that the pieces are arranged consecutively in the known order.

In an embodiment, the cross-sectional area of the peg of the assembly of the present invention is circular.

In an embodiment, the plurality of pieces of the assembly of the present invention is twenty-six.

In an embodiment one of the plurality of pieces of the assembly of the present invention has only an aperture.

In an embodiment, one of the plurality of pieces of the assembly of the present invention has only a peg.

In an embodiment, each of the plurality of pieces of the assembly of the present invention is constructed from wood.

In an embodiment, each of the plurality of pieces of the assembly of the present invention is constructed from an ethylene vinyl acetate (EVA) material.

In an embodiment, each of the plurality of pieces of the assembly of the present invention is uniquely colored.

In an embodiment, each of the plurality of pieces of the assembly of the present invention represent one letter of an alphabet.

In another embodiment of the present invention, a stackable puzzle is provided. The puzzle comprises a first character having at least one peg constructed and arranged perpendicularly to a face of the character. A plurality of additional characters is provided each having at least one peg and at least one aperture wherein the number of pegs is the same as the number of apertures and further wherein the at least one peg and the at least one aperture are constructed and arranged for stacking one of the plurality of characters on the first character and subsequent characters of the plurality of additional characters on one of the others of the plurality of additional characters such that all of the characters are arranged in a known order for the characters following stacking.

In an embodiment, a last character is provided having at least one aperture constructed and arranged to receive the at least one peg of a last one of the plurality of additional characters.

In an embodiment, the apertures of the stackable puzzle of the present invention have a cross-sectional area slightly larger than the cross-sectional area of the pegs.

In an embodiment, the apertures and the pegs of the stackable puzzle of the present invention have circular cross-sections.

In an embodiment, the plurality of additional characters of the stackable puzzle of the present invention is twenty-four.

In an embodiment, each of the characters of the stackable puzzle of the present invention represent a different letter of an alphabet.

In an embodiment, a front face of one of the characters of the stackable puzzle of the present invention is flush against a back face against a subsequent one of the characters.

In another embodiment of the present invention, a method is provided for stacking a plurality of characters representing a set of characters wherein the set is arrangeable in a known order. The method comprises the steps of: providing a first character in the set, the first character having a peg arranged perpendicularly to a face of the character; providing a plurality of subsequent characters in the set, each of the subsequent characters having a peg and an aperture; and stacking one of the plurality of subsequent characters in the set in the known order such that the aperture of the subsequent character uniquely mates with the peg of the first character.

In an embodiment, the method further comprises the step of continuing stacking all of the plurality of subsequent characters in the set in the known order.

In an embodiment, the method further comprises the step of providing a last character in the set wherein the last character has an aperture arranged to receive the peg of a last one of the plurality of subsequent characters.

In an embodiment, the characters are representative of letters of an alphabet.

It is, therefore, an advantage of the present invention to provide an assembly, a stackable puzzle, and a method for stacking a plurality of characters representing a set of characters wherein the set is arranged in a known order.

Another advantage of the present invention is to provide an assembly, a stackable puzzle, and a method for stacking a plurality of characters that is instructional.

Yet another advantage of the present invention is to provide an assembly, a stackable puzzle, and a method for stacking a plurality of characters such that the characters can only be stacked in a known order of the characters.

A further advantage of the present invention is to provide an assembly and a stackable puzzle that is attractive and durable.

A still further advantage of the present invention is to provide an assembly and stackable puzzle that is fun to construct.

Moreover, an advantage of the present invention is to provide an assembly and a stackable puzzle requiring knowledge of an order of the characters to stack the same.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides an instructional toy in the form of a stackable puzzle. Although the embodiment illustrated shows a set of letters forming an alphabet, it should be understood by those skilled in the art that other embodiments may be implemented, such as, for example, a set of numbers wherein the numbers may only be stacked in numerical order. Also, the illustrated embodiments show pegs on each character having circular cross-sections fitting into apertures on adjacent characters having circular cross-sections slightly larger than the circular cross-sections of the pegs. Those skilled in the art, however, may implement other shapes and/or multiple shapes for the pegs and apertures to stack the letters to form the puzzle. It will also be appreciated that each character may include any number of pegs and/or apertures to uniquely mate with another character.

Figure 1:
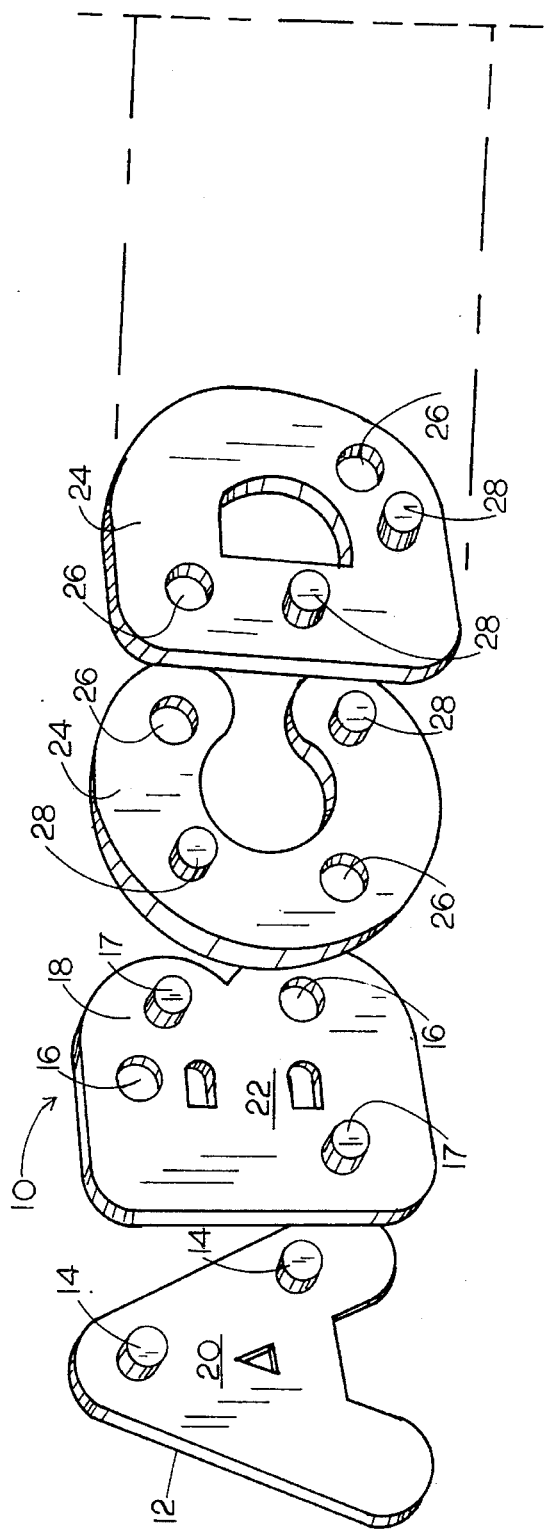
FIG. 1 illustrates a perspective view of a portion of characters in an embodiment of the present invention.
Figure 1:
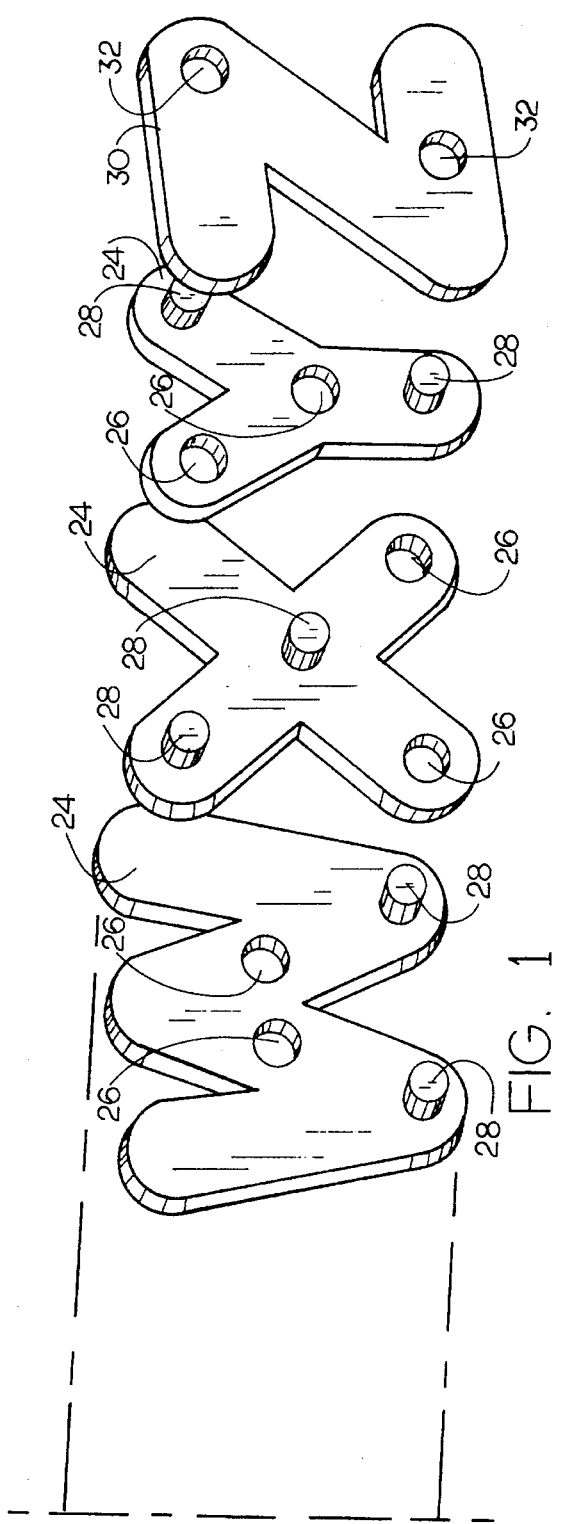

Referring now to the drawings wherein like numerals refer to like parts, FIG. 1 generally illustrates a portion of the pieces necessary for creating a stackable puzzle 10. To this end, a first piece 12 is provided representative of the letter "A". The first piece 12 includes two pegs 14. The pegs 14 are constructed and arranged such that only apertures 16 of a second piece 18 may fit on the pegs 14. The pegs 14 have a height extending perpendicularly from a front face 20 of the first piece 12. The height of each of the pegs 14 is chosen such that, when inserted through the apertures 16 of the second piece 18, the pegs 14 are flush with a front face 22 of the second piece 18. Likewise, the second piece 18 has pegs 17 extending perpendicularly to its front face 22.

Like the second piece 18, each subsequent piece 24 includes apertures 26 and pegs 28, except for a last piece 30 which, in an embodiment, represents the letter "Z". The last piece 30 is constructed to have only apertures 32.

The pegs 17 of the second piece 18 as well as the pegs 28 of the subsequent pieces 24 are identically constructed except for the location of each of the pegs and apertures on and through the face 22 of the second piece 18 and on or through the faces of the subsequent pieces 24.

Each of the pieces from the first piece 12 to the second piece 18 and each of the subsequent pieces 24 to the last piece 30 are known characters which, as a set, may be arranged in a known order. As illustrated, letters of the alphabet starting with "A" as the first piece 12, "B" as the second piece 18 and "C", "D"... "W", "X" and "Y" as the subsequent pieces 24 with the last piece 30 being "Z" are known pieces which, as a whole, form all of the letters of the alphabet as used, for example, in the English language.

Each of the pieces 12, 18, 24 and 30 have a substantially equal width that is substantially equal to the height of the pegs 14, 17 and 28 projecting from the faces of the pieces 12, 18, 24 and 30. Hence, the depth of the apertures 16, 26 and 32 is equal to the width of the pieces 12, 18, 24 and 30 and substantially equal to the height of the pegs 14, 17 and 28.

Figure 4:
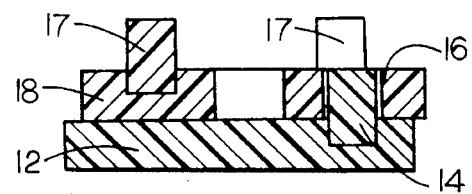
FIG. 4 illustrates a cross-sectional view taken generally along the line IV—IV of FIG. 3.

In a preferred embodiment, the pieces are constructed from wood and the pegs are integrally formed therewith. Each piece has a width of approximately ⅜" to 1" and preferably about ⅝". Consequently, each peg projects from each piece at least ⅜" to 1" and preferably ⅝". The pegs may be separately attached to the pieces by known methods, such as illustrated in FIG. 4, or may be integrally formed as illustrated in, for example, FIG. 1.

In another embodiment of the invention, the pieces and their corresponding pegs are constructed from a foam-like, ethylene vinyl acetate (EVA) material. As a result, the pieces have a flotation property for use in environments where water is present.

Further, each of the pieces may be uniquely colored so as to distinguish each of the pieces and to create an eye-pleasing assembly of pieces. In another embodiment of the present invention, the pegs on each of the pieces may be distinctly colored from the piece itself. Therefore, the pegs are highlighted and may be easily identifiable as to their location on the faces of the pieces.

Figure 2:
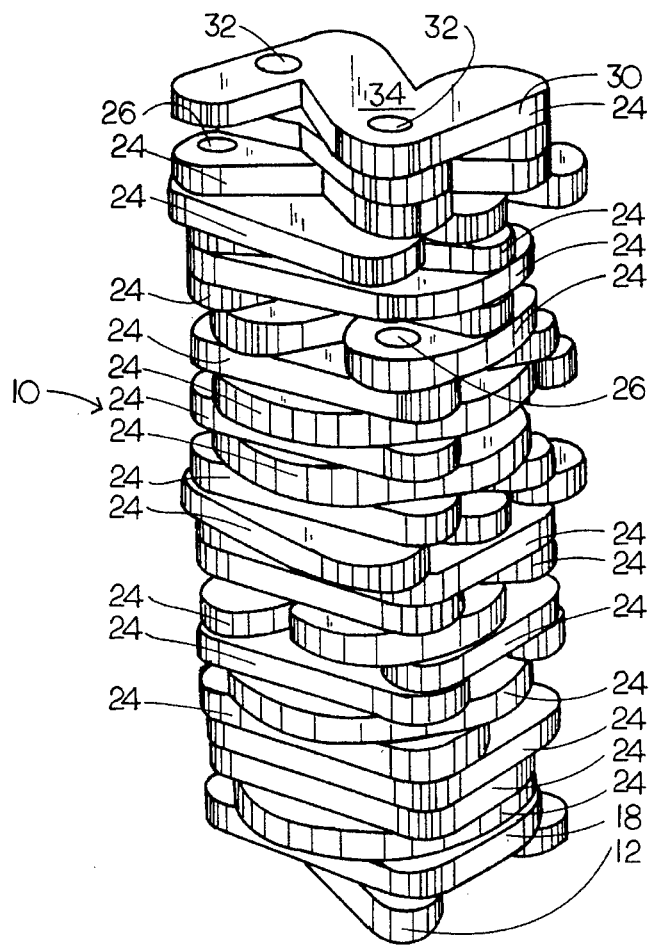
FIG. 2 illustrates a perspective view of characters following stacking of the characters in an embodiment of the present invention.

Referring now to FIG. 2, a completed stackable puzzle is illustrated. In its completed state, the first piece 2 is located at a base of the puzzle 10. The second piece 18 is flush against the front face 20 of the first piece 12. The subsequent pieces 24 are stackable between the second piece 18 and the last piece 30. As previously mentioned, the last piece 30 has only the apertures 32 such that pegs do not extend along a front face 34 of the last piece 34.

Figure 3:
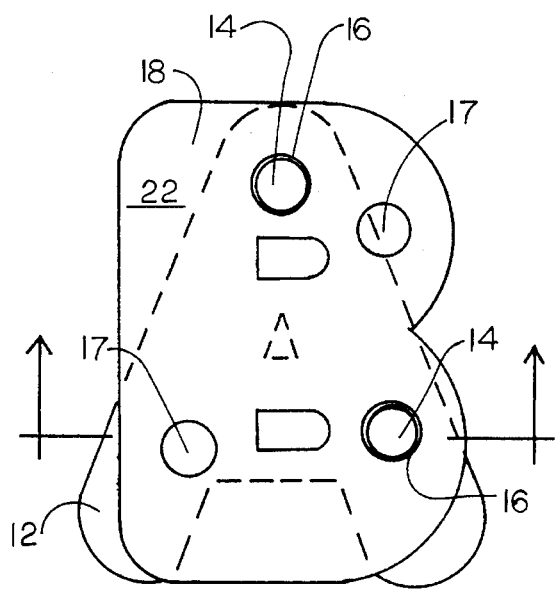
FIG. 3 illustrates a plan view of one character on top of another character in an embodiment of the present invention.

Referring now to FIGS. 3 and 4, the first piece 12 is illustrated in plan view with the second piece 18 stacked thereon. As a result, the pegs 14 of the first piece 12 extend through apertures 16 of the second piece 18. Pegs 17 of the second piece 18 extend perpendicularly to the front face 22 of the second piece 18.

As clearly evident by FIGS. 2 and 3, the pieces are of substantially equal size and of similar or identical font such that the set of pieces provides an eye-pleasing arrangement of stackable pieces. Further, the pieces stack one on top of another such that a substantially vertical stack is provided as illustrated in FIG. 2. The unique arrangement of the pegs and the apertures in each of the pieces allow only a proper piece to be mated with another piece such that a completed puzzle results in a known order of the pieces, such as, for example, the letters of an alphabet.

As more clearly illustrated in FIG. 4, the pegs 14,17 may be, in an embodiment, separately formed and secured to the pieces 12,18, respectively, in a conventional manner. However, depending on the material used, the pegs 14,17 may be integrally formed with the pieces 12,18 without requiring attachment of the pegs 14,17 to the piece 12,18, respectively.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An assembly of known characters arrangeable in a known order, the assembly comprising:

a plurality of pieces, each piece distinctly shaped to represent one of the known characters;

two pegs having a cross-sectional area projecting perpendicularly from each of the plurality of pieces; and two apertures defining a cross-sectional area slightly larger than the cross-sectional area of each of the pegs, the two apertures constructed and arranged through each of the plurality of pieces such that the two pegs projecting from one of the plurality of pieces only fit through the two apertures of another one of the plurality of pieces such that the pieces are arranged consecutively in the known order.

2. The assembly of claim 1 wherein the cross-sectional area of at least one of the pegs is circular.

3. The assembly of claim 1 wherein the plurality of pieces is twenty-six.

4. The assembly of claim 1 wherein each of the plurality of piece is constructed from wood.

5. The assembly of claim 1 wherein each of the plurality of pieces is constructed from an ethylene vinyl acetate material.

6. The assembly of claim 1 wherein each of the plurality of pieces is uniquely colored.

7. The assembly of claim 1 wherein each of the plurality of pieces represent one letter of an alphabet.

8. A stackable puzzle comprising:

a first character having at least one peg constructed and arranged perpendicularly to a face of the character wherein the first character is distinctly shaped to represent a letter of an alphabet; and a plurality of additional characters each having at least one peg and at least one aperture wherein the number of pegs is the same as the number of apertures and further wherein the at least one peg and the at least one aperture are constructed and arranged for stacking one of the plurality of characters on the first character and subsequent characters of the plurality of additional characters on one of the other of the plurality of additional characters such that all of the characters are arranged in a known order for the characters following stacking wherein the plurality of additional characters is distinctly shaped so that each represents a different letter of the alphabet.

9. The stackable puzzle of claim 8 further comprising:

a last character having at least one aperture constructed and arranged to receive the at least one peg of one of the plurality of additional characters wherein the last character is distinctly shaped to represent a different letter of alphabet.

10. The stackable puzzle of claim 8 wherein the apertures have a cross-sectional area slightly larger than the cross-sectional area of the pegs.

11. The stackable puzzle of claim 8 wherein the apertures and the pegs have circular cross-sections.

12. The stackable puzzle of claim 8 wherein the plurality of additional characters is twenty-four.

13. The stackable puzzle of claim 8 wherein a front face of one of the characters is flush against a back face of a subsequent one of the characters.

14. A method for stacking a plurality of characters representing a set of known characters wherein the set is arrangeable in a known order, the method comprising the steps of:

providing a first character in the set, the first character having two pegs arranged perpendicularly to a face of the character wherein the first character is distinctly shaped to represent one of the known characters;

providing a plurality of subsequent characters in the set, each of the subsequent characters having two pegs and two apertures wherein each of the plurality of subsequent characters is distinctly shaped to represent a different one of the known characters; and stacking one of the plurality of subsequent characters in the set in the known order such that the two apertures of the subsequent character uniquely mates with the two pegs of the first character.

15. The method of claim 14 further comprising the step of:

continuing stacking all of the plurality of subsequent characters in the set in the known order.

16. The method of claim 14 further comprising the step of:

providing a last character in the set, the last character having an aperture arranged to receive the peg of a last one of the plurality of subsequent characters wherein the last character is distinctly shaped to represent one of the known characters.

17. The method of claim 14 wherein the characters are representative of letters of an alphabet.

* * * * *